(12) United States Patent
Ishikawa et al.

(10) Patent No.: US 11,743,563 B2
(45) Date of Patent: Aug. 29, 2023

(54) IMAGE PICKUP APPARATUS CAPABLE OF IMPROVING HEAT DISSIPATION

(71) Applicant: CANON KABUSHIKI KAISHA, Tokyo (JP)

(72) Inventors: Shimpei Ishikawa, Kanagawa (JP); Gen Kitamura, Kanagawa (JP); Dai Naito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 17/718,536

(22) Filed: Apr. 12, 2022

(65) Prior Publication Data

US 2022/0353397 A1 Nov. 3, 2022

(30) Foreign Application Priority Data

Apr. 28, 2021 (JP) ................................ 2021-076426

(51) Int. Cl.
*H04N 5/335* (2011.01)
*H04N 23/52* (2023.01)
*H04N 23/51* (2023.01)
*H04N 23/55* (2023.01)

(52) U.S. Cl.
CPC ............. *H04N 23/52* (2023.01); *H04N 23/51* (2023.01); *H04N 23/55* (2023.01)

(58) Field of Classification Search
CPC ..................................................... H04N 23/52
See application file for complete search history.

(56) References Cited

U.S. PATENT DOCUMENTS

2021/0337096 A1* 10/2021 Kawashima ......... H05K 7/2039
2022/0294956 A1*  9/2022 Tamura .................. H04N 23/52

FOREIGN PATENT DOCUMENTS

JP 2014-178565 A 9/2014

* cited by examiner

*Primary Examiner* — Gary C Vieaux
(74) *Attorney, Agent, or Firm* — Cowan, Liebowitz & Latman, P.C.

(57) ABSTRACT

An image pickup apparatus that is capable of improving heat dissipation while reducing a cost and securing reliability of flange back. The image pickup apparatus includes a lens mount to which a lens unit is attachable, and a housing that is formed by inserting a metal member into a resin member and that has a mount portion to which the lens mount is attached. The metal member has a first planar portion that is perpendicular to an optical axis of the lens unit and a second planar portion including at least one planar plate that is bent in an optical axis direction from the first planar portion. The at least one planar plate is inserted into the mount portion.

16 Claims, 8 Drawing Sheets

IMAGE PICKUP APPARATUS CAPABLE OF IMPROVING HEAT DISSIPATION

BACKGROUND OF THE INVENTION

Field of the Invention

The present invention relates to an image pickup apparatus that is capable of improving heat dissipation.

Description of the Related Art

In a field of an image pickup apparatus, such as a digital camera having an exchangeable lens, a conventional apparatus that employs a component formed by inserting a metal plate into a resin member as an inner housing is known (see Japanese Laid-Open Patent Publication (Kokai) No. 2014-178565 (JP 2014-178565A)). However, when external force is applied to a component formed by inserting a metal plate into a resin member, the component may deform. Moreover, the component may deform due to exfoliation caused by external force at an interface between resin and metal. The above-mentioned publication discloses a technique that forms a mirror box from single material so as to prevent change of flange back (distance between a mount and an image pickup surface) due to a deformation of the component.

When the components in connection with the flange back are formed from metal, although rigidity against external force, such as vibration and impact, and heat dissipation are improved, its cost increases. In the meantime, when the above components are formed from resin, the heat dissipation is lowered.

SUMMARY OF THE INVENTION

The present invention provides an image pickup apparatus that is capable of improving heat dissipation while reducing a cost and securing reliability of flange back.

Accordingly, an aspect of the present invention provides an image pickup apparatus including a lens mount to which a lens unit is attachable, and a housing that is formed by inserting a metal member into a resin member and that has a mount portion to which the lens mount is attached, wherein the metal member has a first planar portion that is perpendicular to an optical axis of the lens unit and a second planar portion including at least one planar plate that is bent in an optical axis direction from the first planar portion, and wherein the at least one planar plate is inserted into the mount portion.

According to the present invention, the heat dissipation is improved while reducing the cost and securing the reliability of the flange back.

Further features of the present invention will become apparent from the following description of exemplary embodiments with reference to the attached drawings.

DESCRIPTION OF THE EMBODIMENTS

Figure 1:
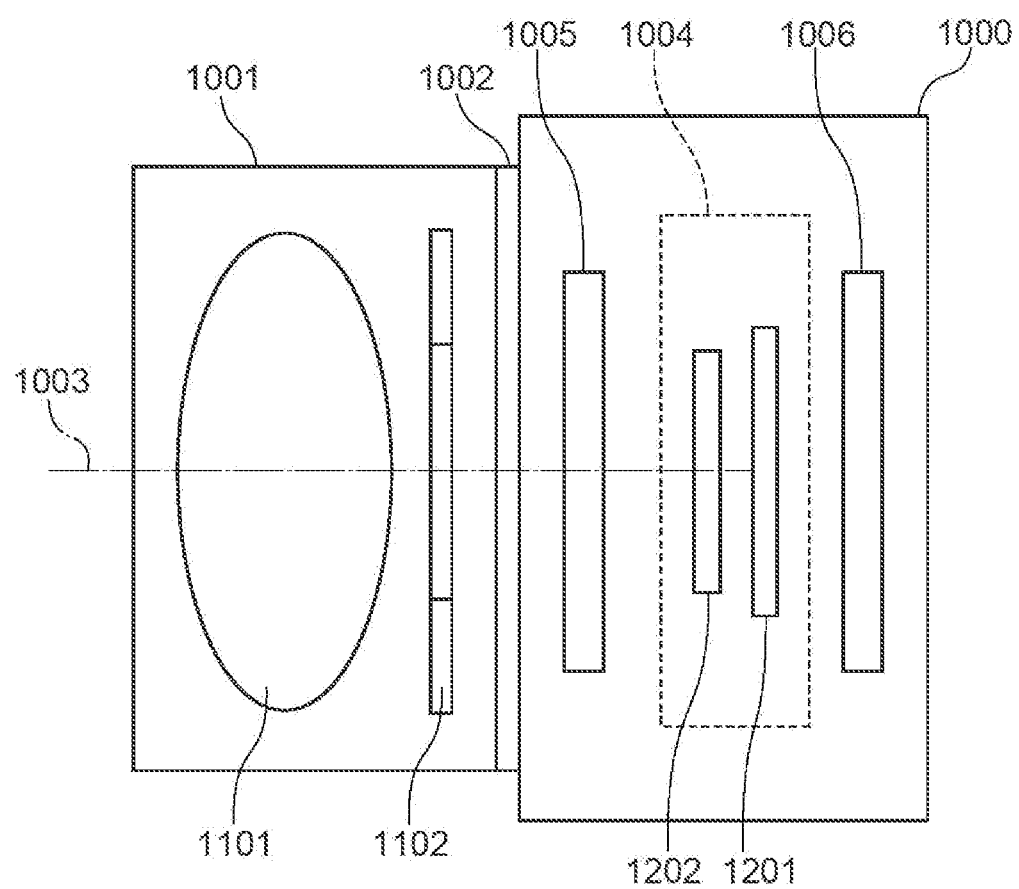
FIG. 1 is a view schematically showing a camera system including an image pickup apparatus according to a first embodiment of the present invention

Hereafter, embodiments according to the present invention will be described in detail by referring to the drawings.

FIG. 1 is a view schematically showing a camera system including an image pickup apparatus according to a first embodiment of the present invention This camera system is constituted as a digital camera system as an example. This camera system consists of a camera body 1000 that is the image pickup apparatus and an image pickup lens 1001 that is detachable from the camera body 1000.

In the image pickup lens 1001, a diaphragm 1102 for adjusting an exposure amount is provided in addition to an image pickup optical system 1101. Although the image pickup optical system 1101 is illustrated as one lens, it is an optical system that actually consists of a plurality of lens groups. A lens mount 1002 can be equipped with a lens unit. For example, the image pickup lens 1001 is connected to the camera body 1000 electrically and mechanically through the lens mount 1002. The image pickup lens 1001 adjusts focus of the image pickup optical system 1101 by moving a focusing lens as a component of the image pickup optical system 1101 by a drive mechanism (not shown) in a direction of an optical axis 1003 of the image pickup optical system 1101.

An image pickup unit 1004 is provided with an image sensor 1201 and an optical low-pass filter 1202. The image sensor 1201 consists of a CCD sensor or a CMOS sensor. The image pickup unit 1004 converts an optical image of an object formed through the image pickup lens 1001 into an electrical signal by driving the image sensor 1201 sporadically or continuously and obtains an image signal of a still image or a moving image. The optical low-pass filter 1202 is constituted so as not to transmit a component more than a predetermined cutoff frequency of the object image to the image sensor 1201.

A focal-plane shutter 1005 that adjusts a light amount that enters into the image sensor 1201 is arranged at the object side (the left side in FIG. 1) of the image pickup unit 1004. A control substrate 1006 is a printed wired board (PWB). The control substrate 1006 is provided with a power supply circuit, an image processing unit, a controller of various systems, etc., and controls operations of the entire camera body 1000.

Figure 2:
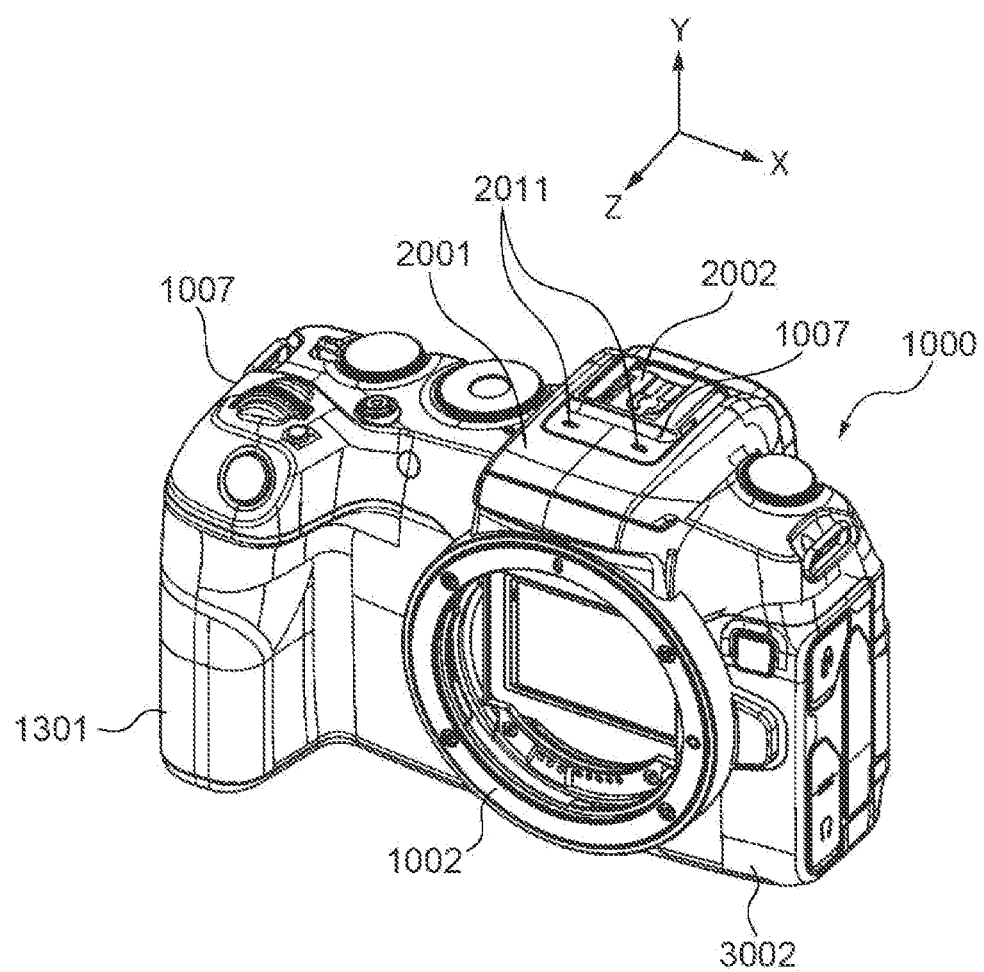
FIG. 2 is a perspective view showing a camera body shown in FIG. 1.

FIG. 2 is a perspective view showing the camera body 1000. Hereinafter, a direction of each part will be called on the basis of X, Y, and Z coordinate axes shown in FIG. 2 etc. In the following description, an object side in a direction parallel to an optical axis direction is called a front. The side of the control substrate 1006 viewed from the lens mount 1002 is called a back. In FIG. 2, a Y-direction is a vertical direction, a Z-direction is a front-back direction and an X-direction is a lateral direction. Particularly, a +Y-direction is an up direction and a +Z-direction is a front direction. A +X-direction is a right direction when viewed from the object side.

The camera body 1000 is provided with an exterior cover 1007 as an exterior member. The exterior cover 1007 has a first grip portion 1301 that is grasped by a user in order to hold the camera body 1000. Moreover, the exterior cover 1007 has a second grip portion 3002 in the opposite side of the first grip portion 1301 in the lateral direction.

The camera body 1000 is provided with a pop-up built-in flash 2001 in a front part at a center in the lateral direction of a top surface. Moreover, the camera body 1000 is provided with an accessory shoe 2002, to which an external accessory can be attached, behind the built-in flash 2001. A pair of first sound holes 2011 are provided in the exterior cover 1007 between the built-in flash 2001 and the accessory shoe 2002 in the front-and-back direction. The first sound holes 2011 are openings for built-in microphones (a left microphone 2021 and a right microphone 2022 shown in FIG. 5A) mentioned later that obtain stereo sound.

Figure 3:
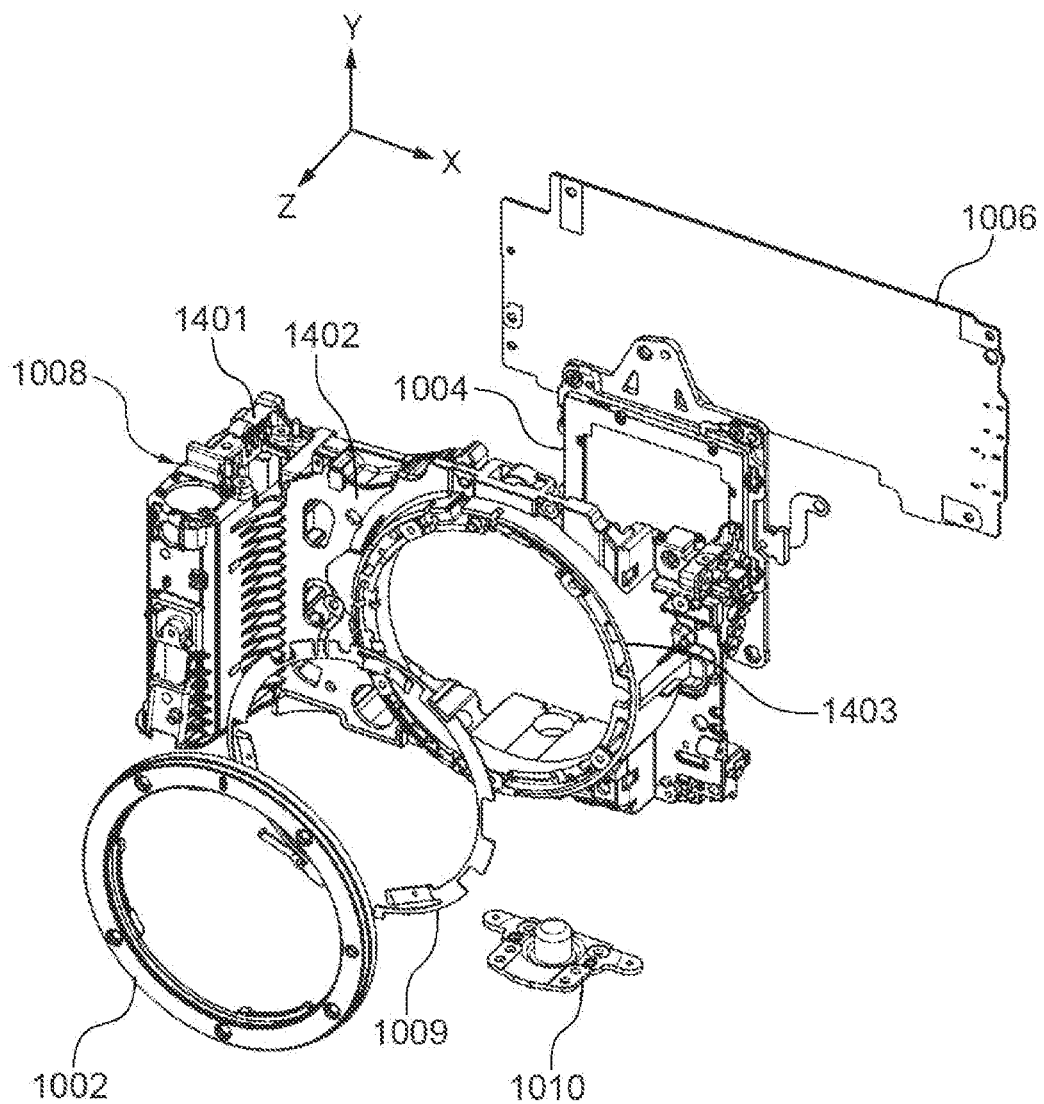
FIG. 3 is an exploded perspective view showing an internal structure of the camera body.

FIG. 3 is an exploded perspective view showing an internal structure of the camera body 1000. A housing 1008 is a component that is formed by insert molding of a metal plate (metal member) 1402 to a resin member 1401. The lens mount 1002 is fixed to a mount portion 1403 of the resin member 1401. A lens energization spring 1009 is a plate spring for drawing a mount of the image pickup lens 1001 into the lens mount 1002 of the camera body 1000, and is arranged between the lens mount 1002 and the mount portion 1403. A tripod seat 1010 is a metal plate that has a tripod attachment part, and is fixed to the bottom side of the housing 1008. The image pickup unit 1004, focal-plane shutter 1005 (FIG. 1), and control substrate 1006 are fixed to the housing 1008 from the back side.

Figure 4:
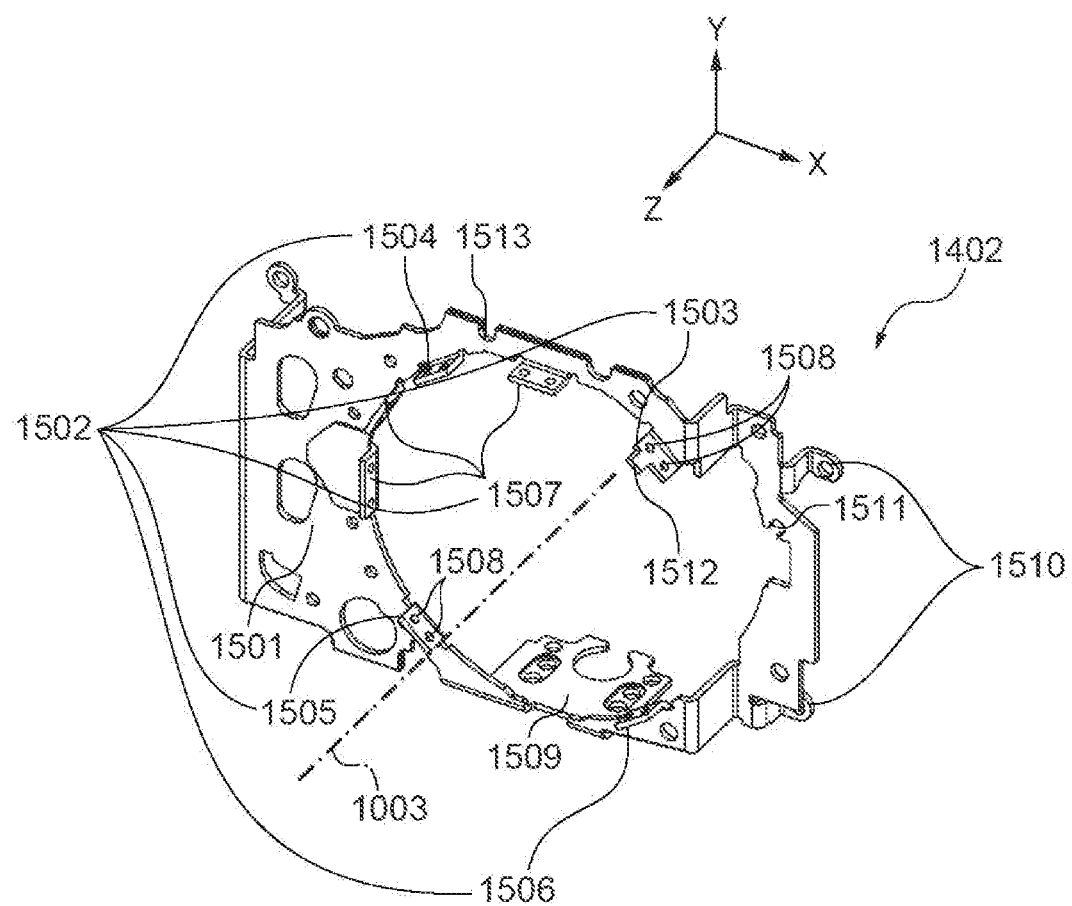
FIG. 4 is a perspective view showing a metal plate shown in the FIG. 3 that will be inserted into a resin member.

FIG. 4 is a perspective view showing a metal plate 1402 that will be inserted into the resin member 1401. First, rigidity of the camera body 1000 is described by referring to FIG. 4.

The metal plate 1402 has a first planar portion 1501 that is approximately perpendicular to the optical axis 1003 and a second planar portion 1502 that is bent in the direction of the optical axis 1003 (+Z-direction) from the first planar portion 1501. The second planar portion 1502 has at least one planar plate that is approximately parallel to the optical axis 1003. In the example shown in FIG. 4, the second planar portion 1502 consists of a plurality of planar plates including a first planar plate 1503, second planar plate 1504, third planar plate 1505, and fourth planar plate 1506. The planar plates of the second planar portion 1502 are inserted into the mount portion 1403 of the resin member 1401 to which the lens mount 1002 is fixed. Thereby, the rigidity of the mount portion 1403 of the housing 1008 is improved.

Moreover, the first planar plate 1503, second planar plate 1504, third planar plate 1505, and fourth planar plate 1506 are arranged at approximately equal angular intervals (approximately 90 degrees) in a circumferential direction around the optical axis 1003. Thereby, even when external force is applied from various directions to the mount portion 1403, the rigidity of the housing 1008 is maintained. It should be noted that the second planar portion 1502 may include at least one of fifth planar plates 1507. Moreover, from a viewpoint of improving the rigidity, the planar plates constituting the second planar portion 1502 are enough to be arranged at approximately equal angular intervals. The planar plates may be arranged at angular intervals of 60 degrees instead of 90 degrees.

Moreover, at least one through hole 1508 penetrated in the direction perpendicular to the optical axis 1003 is formed in each of the planner plates of the second planar portion 1502. When the metal plate 1402 is insert-molded to the resin member 1401, resin enters into the through holes 1508. Thereby, even when external force is applied to the mount portion 1403, exfoliation at the interface between the resin member 1401 and the metal plate 1402 is reduced and which improves the rigidity.

Furthermore, the metal plate 1402 has a third planar portion 1509 that is bent in the direction of the optical axis 1003 (−Z-direction) from the first planar portion 1501. The tripod seat 1010 is fixed to the third planar portion 1509 with screws. Thereby, the rigidity of the periphery of the tripod seat 1010 of the housing 1008 is improved.

In this way, since the rigidity of the housing 1008 is improved, deformation of the housing 1008 due to external force is reduced, change of the flange back is reduced, and its reliability is improved.

Next, heat dissipation of the camera body 1000 will be described. The control substrate 1006 shown in FIG. 3 is fixed to a first contact part 1510 of the metal plate 1402. The image pickup unit 1004 shown in FIG. 3 is fixed to a second contact part 1511 of the metal plate 1402. Thereby, heat that occurs in the control substrate 1006 and the image pickup unit 1004 when the camera body 1000 is driven is efficiently dissipated to the metal plate 1402.

A third contact part 1512 is provided in at least one of the planar plates (the first planar plate 1503 in the example in FIG. 4) of the second planar portion 1502 of the metal plate 1402. The lens mount 1002 contacts the third contact part 1512. The lens energization spring 1009 contacts a fourth contact part 1513 of the metal plate 1402. Thereby, the heat of the metal plate 1402 transfers to the lens mount 1002 and lens energization spring 1009, and is dissipated to the image pickup lens 1001 through the lens mount 1002.

Moreover, at least a part of the first planar portion 1501 of the metal plate 1402 faces the exterior cover 1007 between the first grip portion 1301 and the lens mount 1002 in a radial direction that intersects the optical axis 1003. For example, the first planar portion 1501 faces a part equivalent to the base part (bottom part) at the +X side of the first grip portion 1301. Thereby, the heat of the metal plate 1402 is efficiently dissipated to the exterior cover 1007. Moreover, since the tripod seat 1010 is fixed to the third planar portion 1509 of the metal plate 1402 as mentioned above, the heat of the metal plate 1402 is dissipated to the tripod seat 1010, too.

In this way, the heat that occurs in the control substrate 1006 and the image pickup unit 1004 is dissipated to the lens mount 1002, lens energization spring 1009, image pickup lens 1001, exterior cover 1007, and tripod seat 1010 through the metal plate 1402. In the exterior cover 1007, since the heat that occurs in the camera body 1000 is dissipated to a part that avoids the first grip portion 1301, there is few possibility that a hand of a user touches a heat dissipation section during an image pickup operation.

Incidentally, a conventional camera that holds a microphone with an elastic member so that the microphone cannot directly touch an exterior cover and a pressure member is known. This camera reduces direct transmission of vibration of driving sound of a camera body or a lens to the microphone through the exterior cover or the pressure member, which avoids obtainment of noise sound. For example, the conventional camera that is covered by the elastic member except an opening corresponding to a sound hole of a capacitor microphone is disclosed.

A camera equipped with a reference microphone for noise cancellation is developed in recent years. In such a camera, the reference microphone and a sound obtainment microphone are implemented on the same substrate (i.e., are held by and are fixed to the same component) in order to obtain sound of the same characteristics by the reference microphone and sound obtainment microphone. However, in such a camera, it is difficult to form an elastic member that covers the substrate and microphones like a conventional one.

Moreover, when left and right sound obtainment microphones for obtaining stereo sound and the reference microphone are implemented on the same substrate, the substrate is arranged at the center on the top surface in the lateral direction of the camera in many cases. However, when the camera is provided with a built-in flash in the center in the lateral direction, the arrangement positions of the microphones and elastic member become deep below, which lowers incorporating workability.

Hereinafter, a holding mechanism of built-in microphones will be described by referring to FIG. 5A through FIG. 7B.

Figure 5A:
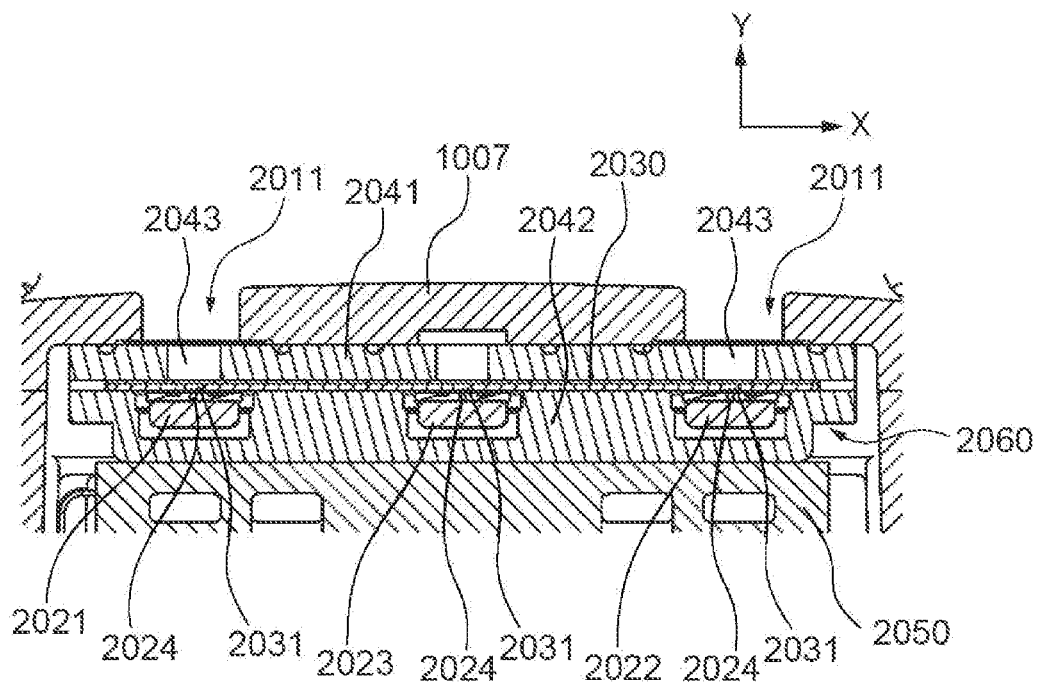
FIG. 5A is an XY sectional view showing the camera body viewed from a front.

FIG. 5A is an XY sectional view showing the camera body 1000 viewed from the front. The camera body 1000 has three built-in microphones including the left microphone 2021, the right microphone 2022, and a reference microphone 2023. These three built-in microphones are implemented on a flexible substrate 2030. The left microphone 2021, reference microphone 2023, and right microphone 2022 are arranged in a line in this order from the −X side. The left microphone 2021 and right microphone 2022 are built-in microphones for obtaining stereo sound. The reference microphone 2023 is a built-in microphone for the noise cancellations for obtaining sound transmitted inside the camera body 1000. The built-in microphones are respectively provided with microphone sound holes 2024. FIG. 5A shows a section that passes through the microphone sound holes 2024 of the built-in microphones.

Openings 2031 are formed in the flexible substrate 2030 corresponding to the positions of the microphone sound holes 2024. Sound is obtained through the opening 2031. The first sound holes 2011 in the exterior cover 1007 are formed above the left microphone 2021 and right microphone 2022. Second sound holes 2043 are formed in a first elastic portion 2041 (mentioned later) at positions corresponding to the openings 2031 of the flexible substrate 2030 corresponding to the microphone sound holes 2024 of the left microphone 2021 and right microphone 2022. The two second sound holes 2043 correspond to the two first sound holes 2011.

In the meantime, the reference microphone 2023 needs to obtain only the sound transmitted inside the camera body 1000, for example, the driving sound of the camera body 1000 or the lens. Accordingly, the exterior cover 1007 is not provided with a sound hole equivalent to the first sound hole 2011 above the reference microphone 2023.

A microphone unit 2060 is arranged mainly under the exterior cover 1007. The microphone unit 2060 will be described by referring to FIG. 6A, FIG. 6B, FIG. 7A, and FIG. 7B.

Figure 5B:
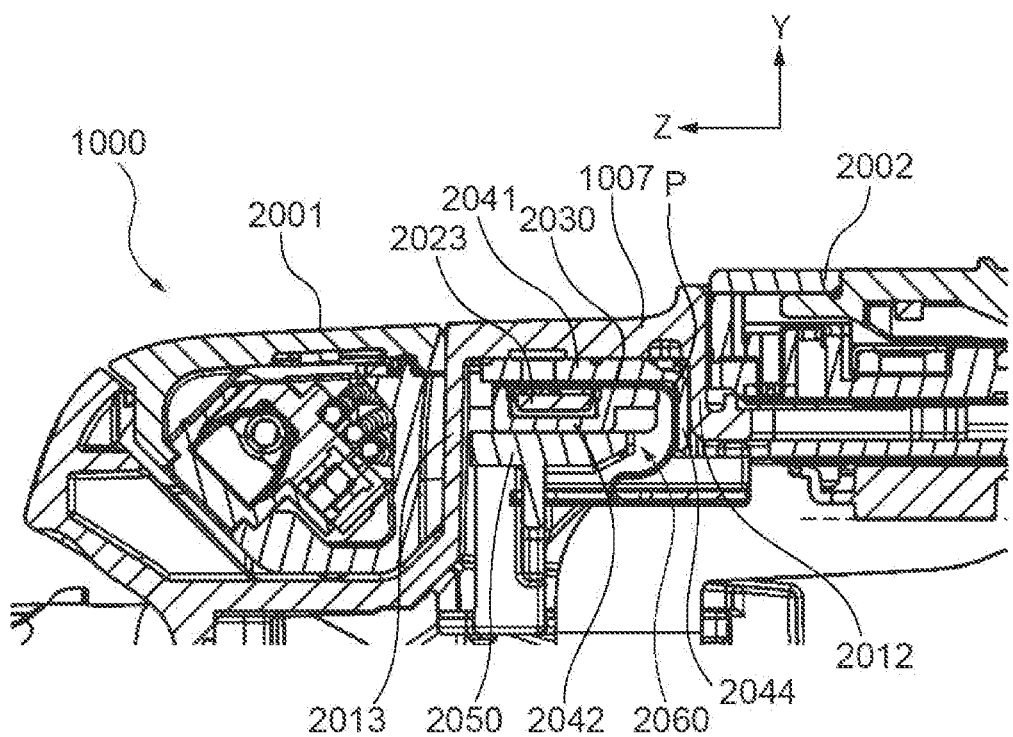
FIG. 5B is a YZ sectional view showing the camera body viewed from a +X side.
Figure 6A:
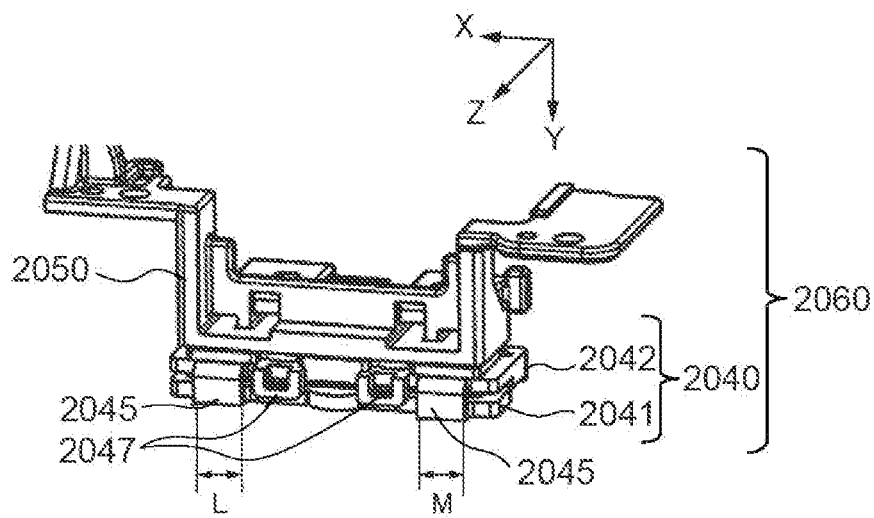
FIG. 6A and FIG. 6B are a perspective view and an exploded perspective view showing a microphone unit.

FIG. 5B is a YZ sectional view showing the camera body 1000 viewed from the +X side. FIG. 5B shows a section that passes through the reference microphone 2023. FIG. 6A is a perspective view showing the microphone unit 2060, and FIG. 6B is an exploded perspective view showing the microphone unit 2060.

Figure 6B:
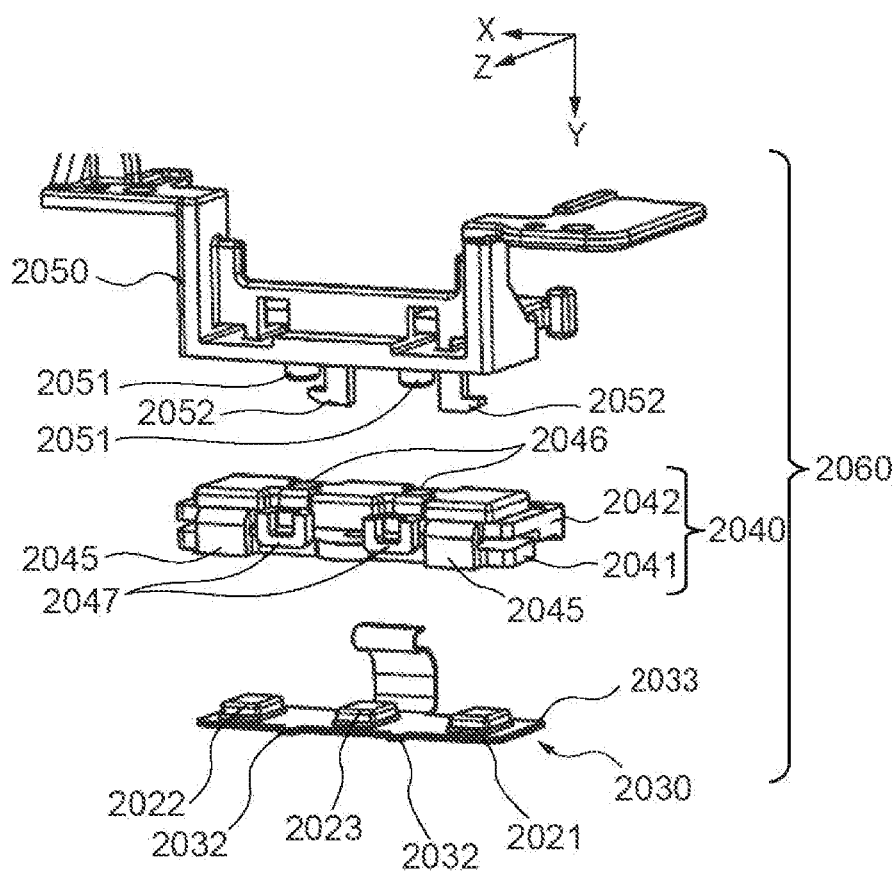

As shown in FIG. 6A and FIG. 6B, the microphone unit 2060 is constituted by unitizing and incorporating a holding member 2050, an elastic member 2040, the left microphone 2021, the right microphone 2022, the reference microphone 2023, and the flexible substrate 2030.

The elastic member 2040 is integrally composed of a first elastic portion 2041, a second elastic portion 2042, and two connection parts 2045. The first elastic portion 2041 and second elastic portion 2042 are connected by the two connection parts 2045 at one side. The elastic member 2040 has a U-shaped section when viewed in the X-direction. The first elastic portion 2041 and second elastic portion 2042 face each other across a gap.

The flexible substrate 2030 on which the built-in microphones are implemented is inserted into the gap between the first elastic portion 2041 and second elastic portion 2042 from the side (−Z side) at which the first elastic portion 2041 and second elastic portion 2042 are not connected.

The holding member 2050 is fixed to the exterior cover 1007 with screws (not shown) so as to compress the first elastic portion 2041, the flexible substrate 2030 on which the built-in microphones are implemented, and the second elastic portion 2042 in a thickness direction (Y-direction). Accordingly, the first elastic portion 2041, flexible substrate 2030, and second elastic portion 2042 are press-held between the exterior cover 1007 and holding member 2050. Accordingly, as shown in FIG. 5A, the exterior cover 1007, first elastic portion 2041, flexible substrate 2030, second elastic portion 2042, and holding member 2050 are located in this order from the +Y side in a space between adjacent built-in microphones.

As shown in FIG. 5A, the flexible substrate 2030 is in pressure-contact with the first elastic portion 2041 with no gap. Moreover, the first elastic portion 2041 is in pressure-contact with the exterior cover 1007 with no gap. Accordingly, when sound is transmitted from the first sound hole 2011 of the exterior cover 1007 to the microphone sound hole 2024 through the second sound hole 2043, mixture of the driving sound of the camera body 1000 or the lens from the space between the flexible substrate 2030 and the exterior covers 1007 is reduced.

Moreover, the flexible substrate 2030 contacts only the first elastic portion 2041 and second elastic portion 2042 between the exterior cover 1007 and the holding member 2050 in the Y-direction. Accordingly, since the driving sound of the camera body 1000 or the lens that is transmitted to the exterior cover 1007 or the holding member 2050 as vibration is hardly transmitted to the flexible substrate 2030 directly, noise sound obtained with built-in microphones is reduced.

As shown in FIG. 5B, the built-in microphone (the reference microphone 2023 in FIG. 5B) is arranged between the built-in flash 2001 and the accessory shoe 2002 in the Z-direction. The exterior cover 1007 has a vertical wall 2012 that is a wall portion interposed between the built-in microphone and the accessory shoe 2002 in the Z-direction. Moreover, the exterior cover 1007 has a vertical wall 2013 interposed between the built-in microphone and the built-in flash 2001 in the Z-direction. In order to miniaturize the camera body 1000, the distance between the built-in flash 2001 and the accessory shoe 2002 needs to be shortened. If the distance between them is shortened, the distance between the vertical walls 2012 and 2013 of the exterior cover 1007 is shortened, and the space in which the built-in microphones are arranged becomes narrow in the Z-direction and becomes deep in the −Y-direction.

In this case, some issues occur. For example, the flexible substrate 2030 is extended at the side where the built-in microphones are not implemented and is connected to a voice control substrate (not shown). When the arrangement space of the built-in microphones is narrow and deep, it is necessary to bend the flexible substrate 2030 at right angle at a P section shown in FIG. 5B. Accordingly, since the flexible substrate 2030 contacts the vertical wall 2012 of the exterior cover 1007 strongly, there is an issue that the driving sound of the camera body 1000 or the lens is easily transmitted to the built-in microphones.

In the meantime, if the built-in microphones are arranged lower than the vertical wall 2012, the arrangement space is widely securable. However, if so, the depth of the first sound hole 2011 (FIG. 5A) of the exterior cover 1007 needs to be deeper by the lowered distance of the built-in microphones. In this case, since another issue that wind noise mixes in the sound that is obtained by the built-in microphone occurs, the lowering of the position of the built-in microphone is not the best way.

Consequently, the embodiment provides an extended portion 2044 that is extended from the first elastic portion 2041 and is inserted between the vertical wall 2012 and the flexible substrate 2030. This prevents the vibration of the vertical wall 2012 from being transmitted to the flexible substrate 2030 directly.

Moreover, if the arrangement space of the built-in microphones is narrow and deep, work to incorporate the built-in microphone, first elastic portion 2041, and second elastic portion 2042 to the exterior cover 1007 becomes difficult. Accordingly, in the embodiment, as mentioned above, the built-in microphones, flexible substrate 2030, first elastic portion 2041, second elastic portion 2042, and holding member 2050 are grouped together into one unit.

Since these components are unitized, a worker is not required to do a work to hold and insert the built-in microphones and elastic member 2040 into a narrow and deep space. The worker is able to incorporate the built-in microphones to the exterior cover 1007 by only holding the holding member 2050.

As shown in FIG. 6B, the holding member 2050 has cylindrical projection parts 2051. The second elastic portion 2042 has holes 2046 of which an inside diameter is smaller than an outside diameter of the projection parts 2051. The second elastic portion 2042 is positioned and held by the holding member 2050 by inserting and pressing the projection parts 2051 of the holding member into the holes 2046 of the second elastic portion 2042 with low pressure.

The second elastic portion 2042 provides four engagement parts 2047 (only two parts at the +Z side are illustrated). The flexible substrate 2030 provides projection parts 2032 and corner parts 2033 (partially not shown) corresponding to the engagement parts 2047. The flexible substrate 2030 is positioned and held by the second elastic portion 2042 because the engagement parts 2047 are engaged with the corresponding projection parts 2032 and corner parts 2033. Moreover, the holding member 2050 is positioned and held by the exterior cover 1007 as mentioned above. Accordingly, since a deviation amount of the first sound hole 2011 to the microphone sound hole 2024 becomes lower than a certain value, degradation of sound quality of the obtained sound is reduced.

Figure 7A:
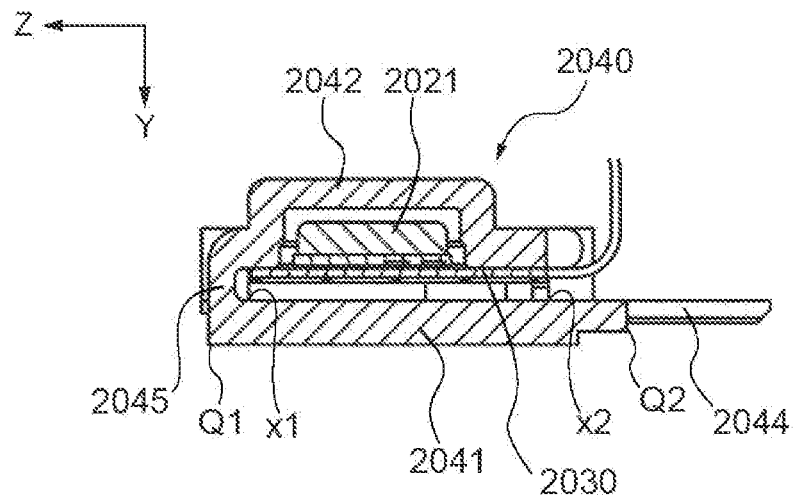
FIG. 7A is a YZ sectional view showing an elastic member into which a flexible substrate is inserted.
Figure 7B:
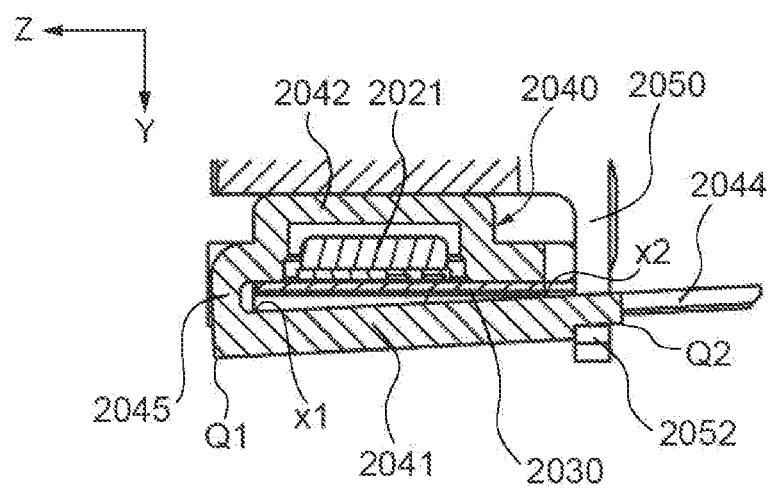
FIG. 7B is a YZ sectional view showing the elastic member held by a holding member.

FIG. 7A is a YZ sectional view showing the elastic member 2040 into which the flexible substrate 2030 is inserted. FIG. 7B is a YZ sectional view showing the elastic member 2040 held by the holding member 2050. FIG. 7A and FIG. 7B are sections that pass through the left microphone 2021. FIG. 7A shows a state where the elastic member 2040 is not held by the holding member 2050, and FIG. 7B shows a state where the elastic member 2040 is held by the holding member 2050.

When the first elastic portion 2041 and second elastic portion 2042 are formed integrally, a certain thickness is required for a form block in order to secure intensity of a form block. When the elastic member 2040 is not yet incorporated to the exterior cover 1007, the gap between the first elastic portion 2041 and the second elastic portion 2042 is larger than the thickness of the flexible substrate 2030. Accordingly, there is a gap between the flexible substrate 2030 and the first elastic portion 2041.

When the elastic member 2040 is incorporated to the exterior cover 1007 and is pressed by the holding member 2050, the flexible substrate 2030 is in close contact with the first elastic portion 2041 as shown in FIG. 5A. However, since the first elastic portion 2041 is connected to the second elastic portion 2042 only by the connection parts 2045, the position of the first elastic portion 2041 may shift when incorporating the microphone unit 2060 in the exterior cover 1007, which makes an assurance of the positional accuracy difficult. When the position of the second sound hole 2043 (FIG. 5A) of the first elastic portion 2041 shifts with respect to the microphone sound hole 2024 or the first sound hole 2011, the sound quality deteriorates.

The microphone unit 2060 of the embodiment includes a configuration that secures the positional accuracy of the first elastic portion 2041 even during incorporation to the exterior cover 1007.

First, as shown in FIG. 7A and FIG. 7B, the +Z side end of the first elastic portion 2041 is connected to the +Z side end of the second elastic portion 2042 through the connection parts 2045. Accordingly, a first end Q1 of the first elastic portion 2041 is connected to the connection part 2045, and the other second end Q2 of the first elastic portion 2041 is not connected to the second elastic portion 2042.

As shown in FIG. 7B, when the elastic member 2040 is held by the holding member 2050 and the microphone unit 2060 is not yet incorporated to the exterior cover 1007, the gap between the first elastic portion 2041 and the second elastic portion 2042 varies depending on the position in the Z-direction. The above-mentioned gap decreases toward the −Z side. For example, about the above-mentioned gap variation in the Z-direction, a gap at a first position x1 near the connection part 2045 is smaller than a gap at a second position x2 distant from the connection part 2045. This is achieved because the second end Q2 of the first elastic portion 2041 is engaged with an engagement part 2052 that is an engaging hook provided in the holding member 2050.

That is, the second end Q2 of the first elastic portion 2041 that contacts the exterior cover 1007 and is distant from the connection part 2045 is held by the engagement part 2052. The area near the second end Q2 contacts the flexible substrate 2030. Thereby, the above-mentioned gap becomes narrower toward the −Z-direction. This state of the microphone unit 2060 is maintained before incorporation to the exterior cover 1007.

According to such a holding mechanism, when the microphone unit 2060 is incorporated to the exterior cover 1007 in the +Y-direction, the first elastic portion 2041 contacts the exterior cover 1007 from the first end Q1 first. Since the first end Q1 is integrated to the second elastic portion 2042 by the connection part 2045, the positional accuracy equivalent to the second elastic portion 2042 is secured.

Since the portion of the elastic member 2040 that contacts the exterior cover 1007 is in close contact with the exterior cover 1007 by frictional force, deviation after that hardly occurs. Accordingly, the portion of the elastic member 2040 that contacts the exterior cover 1007 is fixed to the exterior cover 1007 and its positional accuracy is secured.

When the elastic member 2040 is further pushed against the exterior cover 1007, the area of the first elastic portion 2041 that contacts the exterior cover 1007 spreads. Since the positional accuracy is secured by the first contact, the positional accuracy of the remaining area is also secured after the first contact area. And finally, the state shown in FIG. 5A is achieved while securing the entire positional accuracy of the first elastic portion 2041. Accordingly, the deviation amounts of the second sound hole 2043 with respect to the microphone sound hole 2024 and the first sound hole 2011 can also be kept below a certain value, and the degradation of quality of the sound that is obtained by the built-in microphone is reduced.

When the microphone unit 2060 is incorporated to the exterior cover 1007, the extended portion 2044 contacts the exterior cover 1007 through the flexible substrate 2030 before the elastic member 2040 contacts the exterior cover 1007. Accordingly, when reaction force at the time of deformation of the extended portion 2044 is too large, the connection parts 2045 will deform and the positional accuracy may not be secured at the time when the first elastic portion 2041 contacts the exterior cover 1007.

A thickness of the extended portion 2044 is thinner than a thickness of the first elastic portion 2041 and a thickness of the connection parts 2045. And a width of the extended portion 2044 in the X-direction is smaller than the sum total (width L+M shown in FIG. 6A) of widths of the connection parts 2045. According to such a configuration, the reaction force at the time of deformation of the extended portion 2044 hardly affects on the position of the first elastic portion 2041.

In the configuration equipped with the built-in microphones implemented on the same flexible substrate 2030, the transmission of vibration of the driving sound etc. is reduced at the time of obtaining voice and assemblability is improved.

Incidentally, due to expansion of SNS (Social Networking Service) and a streaming service, a wireless communication module is standardly mounted on a lens interchangeable camera for wireless communication with an external device in many cases. A wireless communication module is arranged near an inside of an exterior in general in order to improve a communication characteristic and to avoid influence of metal shielding members inside a camera.

For example, a conventional camera secures the communication characteristic while reducing influence on an external appearance of the camera by arranging a wireless communication module inside a grip part. However, since the wireless communication module of the conventional camera is covered by a hand when a user holds the grip part, the communication characteristic deteriorates. Moreover, since the wireless communication module generates heat during communication, when a user performs wireless communication while holding the grip part, the user may feel displeasure depending on heating temperature. Accordingly, a heat dissipation member like a graphite sheet is added as a necessary counterplan that protects a user.

Figure 8:
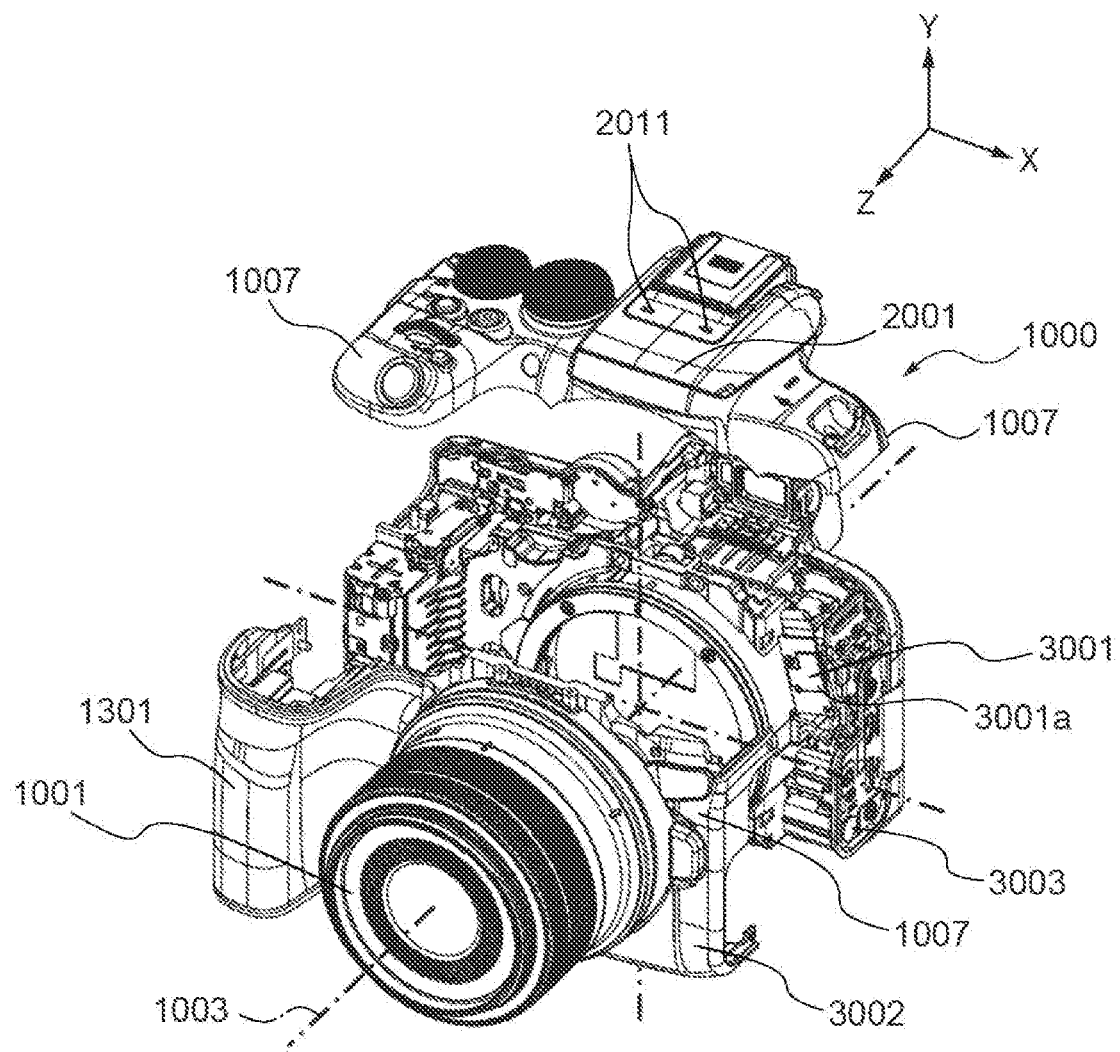
FIG. 8 is an exploded perspective view showing the camera system.

FIG. 8 is an exploded perspective view showing the camera system in the embodiment. Although the external appearance of the camera body 1000 shown in FIG. 8 is slightly different from what is shown in FIG. 2, the internal configuration is identical. For example, the built-in microphones (the left microphone 2021 and right microphone 2022) are arranged under the first sound holes 2011.

As shown in FIG. 8, a wireless module 3001 is arranged in the camera body 1000. The wireless module 3001 is a wireless communication device that transmits/receives image data etc. to/from an external apparatus through wireless communication. The wireless module 3001 includes a function of an antenna for short-range wireless communication like Bluetooth (registered trademark) and can transmit voice data in addition to image data to an external device. The wireless module 3001 is arranged near the inner surface of the exterior cover 1007 in order to secure communication characteristic. It should be noted that the configuration described below is applicable to the camera body 1000 that has the external appearance shown in FIG. 2.

Moreover, the wireless module 3001 is arranged at the opposite side of the first grip portion 1301 across the optical axis 1003 (interposing the optical axis 1003). Moreover, the wireless module 3001 is arranged at an upper side (+Y side) than the optical axis 1003. An antenna surface 3001a of the wireless module 3001 intersects with the optical axis 1003 at approximately right angle. The antenna surface 3001a is close to the portion of the front side of the exterior cover 1007.

When a user holds the camera body 1000, the first grip portion 1301 is covered with a hand of the user. If the wireless module 3001 were arranged in the first grip portion 1301, the communication characteristic of the wireless module 3001 would deteriorate by being covered by a hand. Since the camera body 1000 employs the lens exchangeable system, when a user holds the first grip portion 1301 with a right hand and holds the image pickup lens 1001 with a left hand, the left hand does not cover the second grip portion 3002. The wireless module 3001 is located at the opposite side of the first grip portion 1301 and at the upper side than the optical axis 1003 and second grip portion 3002. Accordingly, since a user usually does not cover the wireless module 3001 by a hand, the communication characteristic hardly deteriorates.

Moreover, the wireless module 3001 generates heat due to communication with an external device. As mentioned above, the wireless module 3001 is arranged near the inner surface of the exterior cover 1007 in order to secure the communication characteristic. When the wireless module 3001 generates heat and a user holds a heated part of the exterior member for a long time, the user may feel displeasure depending on heating temperature. In the embodiment, since the wireless module 3001 is arranged at the position that is hardly covered by a hand of a user, the user usually does not feel displeasure.

The built-in flash 2001 is arranged above the optical axis 1003 in the camera body 1000. The built-in flash 2001 contains many shielding components (a xenon tube and reflection umbrella for light emission, and lead lines for electric power supply) that shield the wireless communication. In the embodiment, since the wireless module 3001 is arranged at the opposite side of the first grip portion 1301 across the optical axis 1003, the influence of the shielding components in the built-in flash 2001 upon the communication characteristic is avoidable.

Moreover, an external microphone terminal 3003 to which an external microphone is connected is mounted on the camera body 1000. The external microphone, such as a MEMS microphone or a capacitor microphone, connected to the external microphone terminal 3003 also converts sound obtained during movie capturing into an audio signal as with the built-in microphones. The audio signal is stored in a recording medium. Since the audio signal is an analog signal basically, when the wireless communication is performed during the movie capturing, a wireless communication signal causes a cross talk with the audio signal, which may be stored as noise to the audio signal in the recording medium.

In order to prevent this, it is effective to separate the audio signal and the wireless communication signal physically.

In the camera body 1000, the wireless module 3001 is separated from the built-in microphones and external microphone terminal 3003 by a predetermined distance (about 20 mm) or more. This reduces a possibility that the wireless communication signal causes the cross talk to the audio signal. As a result, even if the wireless communication is performed during the movie capturing, the probability of mixing of noise in the audio signal is reduced. From a viewpoint of maintaining the communication characteristic, even if the predetermined distance cannot be secured, the wireless module 3001 should be arranged at a position that does not overlap with the built-in microphones and external microphone terminal 3003 when viewed in the optical axis direction.

In this way, the wireless module 3001 in the camera body 1000 is arranged while considering the influence of the user's hand, the influence of the shielding components in the built-in flash 2001, and the influence upon the audio signal of the built-in/external microphone. Thereby, even when the user holds the grip part, the characteristic of the wireless communication with an external device does not deteriorate. Particularly, since the wireless module 3001 is arranged in the position that is not covered by a user's hand, there are few possibilities of giving displeasure to the user when the wireless module 3001 generates heat.

According to the embodiment, the camera body 1000 has the housing 1008 that is formed by inserting the metal plate 1402 into the resin member 1401. Such insert molding reduces the cost and increases the heat dissipation. The metal plate 1402 has the first planar portion 1501 that is approximately perpendicular to the optical axis 1003 and the second planar portion 1502 including at least one planar plate that is bent in the optical axis direction from the first planar portion 1501 (FIG. 4). The planar plates of the second planar portion 1502 are inserted into the mount portion 1403. This improves the rigidity of the housing 1008 and reduces deformation, which increases the reliability of the flange back. Accordingly, the heat dissipation is improved while reducing the cost and securing the reliability of the flange back.

Moreover, since the control substrate 1006 is fixed to the metal plate 1402, the heat generated in the control substrate 1006 is efficiently dissipated to the metal plate 1402. Moreover, since the first planar portion 1501 of the metal plate 1402 faces the exterior cover 1007 between the first grip portion 1301 and lens mount 1002, the heat of the metal plate 1402 is efficiently dissipated to the exterior cover 1007.

Moreover, since the tripod seat 1010 is fixed to the third planar portion 1509 of the metal plate 1402, the heat of the metal plate 1402 is dissipated to the tripod seat 1010 and the rigidity of the housing 1008 increases. Moreover, the lens mount 1002 contacts the third contact part 1512 of the second planar portion 1502, and the lens energization spring 1009 contacts the fourth contact part 1513 of the metal plate 1402. Thereby, the heat of the metal plate 1402 is dissipated to the image pickup lens 1001 through the lens energization spring 1009 and lens mount 1002.

Moreover, since the second planar portion 1502 includes the planar plates that are arranged at the approximately equal angular intervals in the circumferential direction around the optical axis 1003, the housing 1008 exhibits high rigidity to external force applied from various directions to the mount portion 1403. Moreover, since resin enters into the through holes 1508 of the planar plates of the second planar portion 1502, the exfoliation at the interface between the resin member 1401 and the metal plate 1402 is reduced, which improves the rigidity of the housing 1008.

Moreover, the gap between the first elastic portion 2041 and the second elastic portion 2042 decreases toward the −Z side in the state where the elastic member 2040 is held by the holding member 2050 and the microphone unit 2060 is not yet incorporated to the exterior cover 1007 (FIG. 7B). That is, the gap at the second position x2 distant from the connection part 2045 is smaller than the gap at the first position x1 near the connection part 2045. Thereby, the positional displacement of the second sound hole 2043 with respect to the microphone sound hole 2024 and first sound hole 2011 is reduced.

Moreover, the extended portion 2044 extended from the first elastic portion 2041 is inserted between the vertical wall 2012 of the exterior cover 1007 and the flexible substrate 2030 (FIG. 5B). Thereby, the direct transmission of the vibration of the exterior cover 1007 to the flexible substrate 2030 is reduced.

Moreover, the thickness of the extended portion 2044 is thinner than the thicknesses of the first elastic portion 2041 and connection part 2045, and the width of the extended portion 2044 is smaller than the sum total (L+M) of the widths of the connection parts 2045. Thereby, the reaction force at the time of deformation of the extended portion 2044 hardly affects on the position of the first elastic portion 2041. This also reduces the positional displacement of the sound hole.

Moreover, the wireless module 3001 is arranged at the opposite side of the first grip portion 1301 across the optical axis 1003 and at the upper side than the optical axis 1003 (FIG. 8). Furthermore, the wireless module 3001 is located above the second grip portion 3002. These maintain the communication characteristic of the wireless module 3001 and reduce the transmission of the heat of the wireless module 3001 to the user who holds the first grip portion 1301 or the second grip portion 3002.

It should be noted that a value to which "approximately" is added does not except a just value in the embodiment. For example, "approximately perpendicular", "intersection at approximately right angle", and "approximately equal interval" respectively include "perpendicular", "intersection at right angle", and "equal interval".

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such deformations and equivalent structures and functions.

This application claims the benefit of Japanese Patent Application No. 2021-076426, filed Apr. 28, 2021, which is hereby incorporated by reference herein in its entirety.

What is claimed is:
1. An image pickup apparatus comprising:
a lens mount to which a lens unit is attachable; and
a housing that is formed by inserting a metal member into a resin member and that has a mount portion to which the lens mount is attached,
wherein the metal member has a first planar portion that is perpendicular to an optical axis of the lens unit and a second planar portion including at least one planar plate that is bent in an optical axis direction from the first planar portion, and wherein the at least one planar plate is inserted into the mount portion.

2. The image pickup apparatus according to claim 1, further comprising a control substrate fixed to the metal member.

3. The image pickup apparatus according to claim 1, further comprising an exterior member that has a first grip portion held by a user,
wherein at least one part of the first planar portion faces the exterior member between the mount portion and the first grip portion in a radial direction that intersects the optical axis.

4. The image pickup apparatus according to claim 1, wherein the metal member has a third planar portion that is bent in the optical axis direction from the first planar portion, and
wherein a tripod seat is fixed to the third planar portion.

5. The image pickup apparatus according to claim 1, further comprising an image pickup unit that is fixed to the metal member.

6. The image pickup apparatus according to claim 1, wherein the at least one planar plate contacts the lens mount.

7. The image pickup apparatus according to claim 1, further comprising a lens energization spring that draws the lens unit to the lens mount,
wherein the lens energization spring contacts the metal member.

8. The image pickup apparatus according to claim 1, wherein the second planar portion includes planar plates that are arranged at equal angular intervals in a circumferential direction around the optical axis.

9. The image pickup apparatus according to claim 1, wherein a through hole is formed in the at least one planar plate of the second planar portion, and
wherein the resin member is entered into the through hole.

10. The image pickup apparatus according to claim 1, further comprising:
a holding member;
a flexible substrate;
a built-in microphone implemented on the flexible substrate;
an elastic member of a U-shaped section that has a first elastic portion having a first sound hole corresponding to the built-in microphone, a second elastic portion, and a connection part that connects ends of the first elastic portion and the second elastic portion; and
an exterior member that has a second sound hole corresponding to the first sound hole,
wherein a microphone unit is constituted by holding the built-in microphone, the elastic member, and the flexible substrate with the holding member in a state where the microphone is inserted into a gap between the first elastic portion and the second elastic portion,
wherein the flexible substrate, the built-in microphone, and the elastic member are interposed between the holding member and the exterior member by incorporating the microphone unit to the exterior member from a side of the first elastic portion, and
wherein the gap at a second position distant from the connection part is smaller than the gap at a first position near the connection part in a state where the microphone unit is not yet incorporated to the exterior member.

11. The image pickup apparatus according to claim 10, wherein the holding member has an engagement part, and
wherein an end of the first elastic portion at a side that contacts the exterior member and a side distant from the connection part is held by the engagement part so that the gap at the second position will be smaller than the gap at the first position.

12. The image pickup apparatus according to claim 10, further comprising an accessory shoe,
wherein the exterior member has a wall portion that is interposed between the built-in microphone and the accessory shoe, and
wherein an extended portion extended from the first elastic portion is inserted between the flexible substrate and the wall portion.

13. The image pickup apparatus according to claim 12, wherein a thickness of the extended portion is thinner than any of a thickness of the first elastic portion and a thickness of the connection part, and a width of the extended portion is smaller than a width of the connection part.

14. The image pickup apparatus according to claim 1, further comprising:
an exterior member that has a first grip portion held by a user; and
a wireless module for wireless communication,
wherein the wireless module is arranged at an opposite side of the first grip portion across the optical axis and at an upper side than the optical axis.

15. The image pickup apparatus according to claim 14, wherein the exterior member has a second grip portion at an opposite side of the first grip portion in a lateral direction, and
wherein the wireless module is located above the second grip portion.

16. The image pickup apparatus according to claim 14, further comprising:
a built-in microphone; and
a microphone terminal to which an external microphone is connectable,
wherein the wireless module is arranged at a position that does not overlap with the built-in microphones and the microphone terminal when viewed in the optical axis direction.

* * * * *